(12) United States Patent
Schmid

(10) Patent No.: US 6,928,778 B2
(45) Date of Patent: Aug. 16, 2005

(54) STUCCO ANCHORAGE NAIL

(76) Inventor: Ben L. Schmid, 203 Pearl Ave., Balboa Island, CA (US) 92662

( * ) Notice: Subject to any disclaimer, the term of this patent is extended or adjusted under 35 U.S.C. 154(b) by 0 days.

(21) Appl. No.: 10/211,832

(22) Filed: Aug. 2, 2002

(65) Prior Publication Data

US 2003/0024193 A1 Feb. 6, 2003

Related U.S. Application Data

(60) Provisional application No. 60/309,967, filed on Aug. 3, 2001.

(51) Int. Cl.[7] ............................................. E04F 13/04
(52) U.S. Cl. ....................... 52/363; 52/741.41; 411/482
(58) Field of Search ........................... 52/741.41, 363, 52/361, 362, 342, 343, 394, 474, 483.1, 745.19; 411/482, 542, 923, 371.1, 371.2, 400, 455, 456, 544, 368, 369; 256/10

(56) References Cited

U.S. PATENT DOCUMENTS

| | | | | |
|---|---|---|---|---|
| 1,561,518 A | * | 11/1925 | Graham | 52/363 |
| 1,767,565 A | * | 6/1930 | Thrift et al. | 52/680 |
| 2,114,451 A | * | 4/1938 | Mattes | 52/385 |
| 2,692,496 A | * | 10/1954 | Thomas | 52/597 |
| 3,096,680 A | * | 7/1963 | Dudgeon | 411/480 |
| 4,932,820 A | * | 6/1990 | Schniedermeier | 411/455 |
| 4,948,312 A | * | 8/1990 | Jochum | 411/368 |
| 5,011,354 A | * | 4/1991 | Brownlee | 411/439 |
| 5,024,038 A | * | 6/1991 | DePellegrini et al. | 52/700 |
| 5,118,235 A | * | 6/1992 | Dill | 411/368 |
| 5,755,545 A | * | 5/1998 | Banks | 411/482 |
| 5,810,534 A | * | 9/1998 | Carlisle et al. | 411/455 |
| 5,870,870 A | * | 2/1999 | Utzman | 52/483.1 |
| 6,023,891 A | * | 2/2000 | Robertson et al. | 52/125.4 |
| 6,062,789 A | * | 5/2000 | Pope | 411/482 |
| 6,134,847 A | * | 10/2000 | Bifano et al. | 52/58 |
| 6,295,773 B1 | * | 10/2001 | Alty | 52/202 |
| 6,324,810 B1 | * | 12/2001 | Thompson | 52/713 |
| 2002/0108339 A1 | * | 8/2002 | Adebar et al. | 52/363 |
| 2003/0024193 A1 | * | 2/2003 | Schmid | 52/361 |
| 2003/0024198 A1 | * | 2/2003 | Schmid | 52/578 |

* cited by examiner

*Primary Examiner*—Naoko Slack
(74) *Attorney, Agent, or Firm*—Christie, Parker & Hale, LLP

(57) ABSTRACT

A fastener including a body having a predetermined axial length, wherein the body includes a nail head at one axial end of the body, a textured portion at an opposite axial end of the body, a shank portion extending between the nail head and the textured portion, and wherein the shank portion has an axial length in excess of at least one-third of the axial length of the fastener body, a raised ring integrally formed in the shank portion intermediate the nail head and the textured portion and a resilient ring seated against the raised ring on the side of the raised ring opposite the nail head.

16 Claims, 2 Drawing Sheets

STUCCO ANCHORAGE NAIL

CROSS-REFERENCE TO RELATED APPLICATION(S)

This application claims priority under 35 U.S.C. §119 (e) to U.S. Provisional Application Ser. No. 60/309,967, filed Aug. 3, 2001. This application is also related to co-pending U.S. patent application Ser. No. 10/211,809 and U.S. patent application Ser. No. 10/211,790 filed on even date herewith, each of which is incorporated by reference.

FIELD OF THE INVENTION

The present invention is related to a fastener for stucco sheathings, and more particularly, to a specially configured nail for use in construction of wood frame structures to which stucco is attached to the exterior thereof to improve the resistance of the stucco to shearing forces caused by seismic and hurricane lateral loading.

BACKGROUND

As observed, reported and learned from nine California earthquakes since 1951, existing portland cement-based exterior plaster (stucco) of wooden-framed structures has had little success in surviving intense lateral loads caused by earthquake, as well as hurricane forces. For example, the shaking intensity during the 1994 Northridge Earthquake, which in some locations reached magnitudes of 8 and 9 Modified Mercalli Intensity (MMI), was enough to detach stucco sheathings from the wooden frame of many one and two story single family residences and apartment buildings. Such detachment of the stucco sheathings from the wood framing resulted in heavy interior damage, uninhabitable structures and required the removal and replacement of the stucco sheathings.

A primary reason for the detachment of the stucco from the wood framing was the Uniform Building Code's approval of staples, since 1957, for attaching a reinforcing wire mesh to the wood framing prior to applying the stucco over the wire mesh coupled with the requirement of the Uniform Building Code in 1967 that a 26 gauge corrosion resisting continuous drip screed be installed against the mud sill plate, which is disposed along the lower portion of the wood framing. The mud sill plate has a minimum of a one inch overlap below the wood sill plate. The continuous drip screed is typically attached to the mud sill by the use of nails so that the stucco ends evenly just below the mud sill. Waterproof building paper and wire mesh or metal lath are then installed over the drip screed.

The wire mesh or metal lath is normally attached to the metal drip screed by use of the Uniform Building Code's specified staples, which are typically applied by use of a staple gun. Many times, the staple legs become bent and do not penetrate the metal drip screed. Staples used to fasten the wire mesh at the drip screed are often rusted out within a few years due to moisture rusting and weakening the thin staple legs. Stucco having poor lateral attachment to the mud sill due to unattached or rusted staples, typically fails at the wood sill plate during intense lateral displacement of the wood framing generated by such forces as earthquakes and/or hurricanes. Failure of the stucco sheathing generally results in heavy structural damage, often leaving the structure uninhabitable and needing complete replacement of the exterior stucco sheathing.

Therefore there is a need for a device and method of improving the strength of stucco sheathing against intense lateral forces, which is inexpensive and easily installed during new construction and prior to the application of portland cement plaster (stucco) to provide anchorage of stucco sheathings to the wood sill plates at the base of the wall and to other portions of the wood framing.

SUMMARY OF THE INVENTION

An exemplary embodiment of the present invention includes a fastener comprising a body having a predetermined axial length, wherein the body comprises a nail head at one axial end of the body, a textured portion at an opposite axial end of the body and a shank portion extending between the nail head and the textured portion, and wherein the shank portion has an axial length in excess of at least one-third of the axial length of the fastener body. The body further comprises a raised ring integrally formed in the shank portion intermediate the nail head and the textured portion and a resilient ring seated against the raised ring on the side of the raised ring opposite the nail head.

Another exemplary embodiment of the present invention includes a building structure comprising a building frame, one or more layers of stucco sheathing and a plurality of fasteners for securing a predetermined portion of the stucco sheathing to the building frame, wherein each fastener comprises a body of a predetermined axial length having a nail head at one axial end of the body, a textured portion at an opposite axial end of the body, and a shank portion extending between the nail head and the textured portion, wherein the shank portion has an axial length in excess of at least one-third of the axial length of the fastener body. The body further comprises a raised ring integrally formed in the shank portion intermediate the nail head and the textured portion and a resilient ring seated against the raised ring on the side of the raised ring opposite the nail head.

A further embodiment of the present invention includes a method of improving a lateral resistance of a stucco sheathing that is attached to a building frame. The method comprises providing a building frame and providing one or more layers of stucco sheathing. A plurality of stucco anchorage fasteners of the present invention are provided, wherein in each fastener comprises a body of a predetermined axial length having a nail head at one axial end of the body, a textured portion at an opposite axial end of the body, and a shank portion extending between the nail head and the textured portion, wherein the shank portion has an axial length in excess of at least one-third of the axial length of the fastener body. The body further comprises a raised ring integrally formed in the shank portion intermediate the nail head and the textured portion and a resilient ring seated against the raised ring on the side of the raised ring opposite the nail head. The plurality of fasteners are then installed to secure the stucco sheathing to the building frame.

BRIEF DESCRIPTION OF THE DRAWINGS

These and other features and advantages of the present invention will be better understood by reference to the following detailed description when considered in conjunction with the accompanying drawing wherein:

As shown in FIG. 2, a typical building structure or structural frame 30 comprises a series of studs 32 such as 2×4 or 2×6 wooden studs, a sill plate 34 such as a wooden sill plate as well as window jambs and door jambs among other structures (not shown). The frame 30 is anchored to a building foundation 35 such as an on-grade concrete slab, by being anchored to the sill plate 34, which is in turn anchored to the foundation 35 by bolts. Insulation 36 is typically disposed between the studs 32 to thermally "proof" the structure 30.

Figure 1:
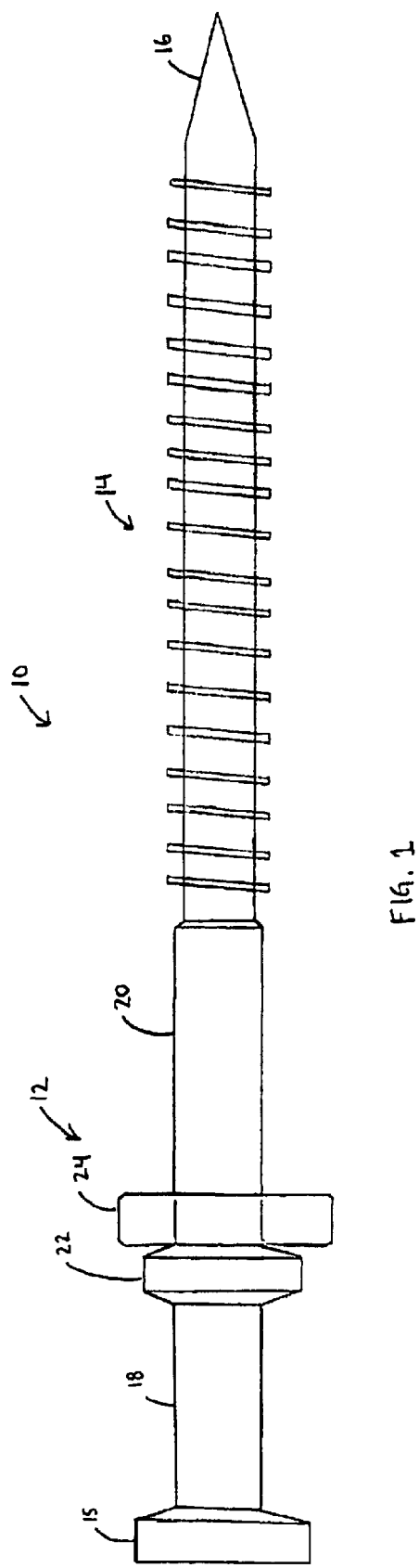
FIG. 1 is an elevation view of a stucco anchorage nail according to the present invention.
Figure 2:
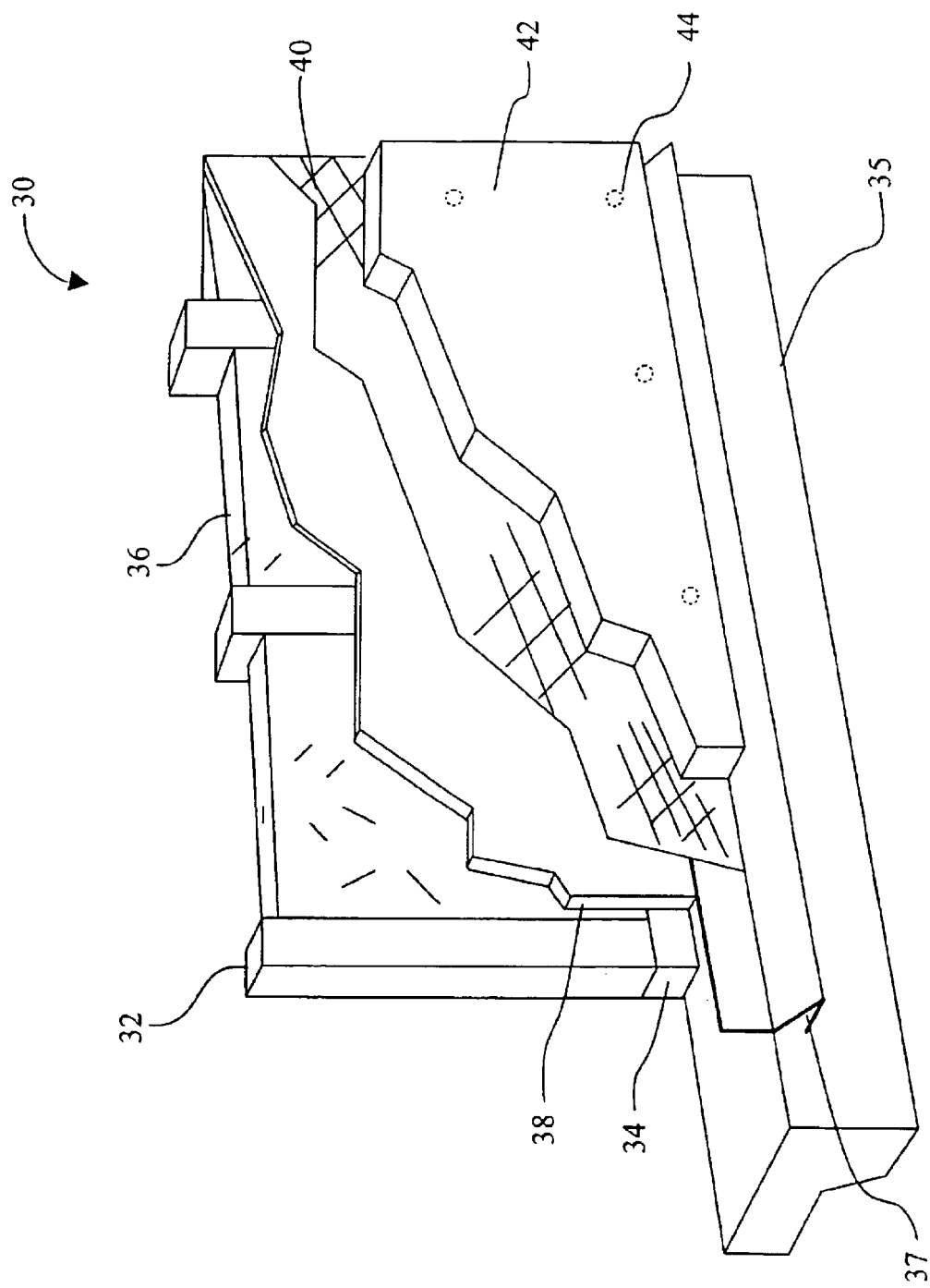
FIG. 2 is a partial perspective view of an exterior wall plate of a typical wood framing.

Building paper 38 such as waterproof building paper and a metal lathe or wire mesh 40 are generally attached to the frame 30 by fasteners, according to the present invention before a stucco sheathing 42 is applied over the wire mesh 40 as an exterior finish to the frame 30. The wire mesh 40 is secured by fasteners 44. Typically, the stucco sheathing 42 is applied over the wire mesh 40 such that bonding occurs between the stucco sheathing 42 and the wire mesh 40. The stucco sheathing 42 may be applied in several coats such as three coats A drip screed 37 may be installed between the building 30 and stucco sheathing 42, for example, at the base of the frame 30. The drip screed 37 helps prevent moisture from entering the junction at the bottom of the frame 30 and the foundation 35.

DETAILED DESCRIPTION

A nail 10 according to the present invention is shown in FIG. 1 in a side elevation view. The nail comprises a shank portion 12 and a textured portion 14. Nail 10 has a nail head 15 located at one axial end of the nail and a pointed tip 16 at the opposite axial end of the nail. Shank portion 12 comprises an upper portion 18 and a lower portion 20. A raised ring or circular ridge 22 is integrally formed with shank portion 12 approximately in the center of shank portion 12. The ring or ridge 22 forms a second head on the nail 10 which has a diameter slightly smaller than the outside diameter of head 15. Seated against ring 22 is a disk 24 of a resilient material which is fitted onto lower shank portion 20 and seated against the side of ring 22 opposite head 15. Shank upper and lower shank portions 18, 20 have a smooth surface. Textured portion 14 is provided with a spiral texture or ring shank texture extending from the end of lower shank portion 20 to tip 16. In an exemplary embodiment of the invention, the stucco anchorage nail is a double-headed nail having a 0.162 inch diameter shank. The diameter of head 15 is $9/32$ of an inch and its axial thickness dimension is $1/16$ of an inch. Ring 22 is spaced approximately 2 inch from head 15 and is $1/4$ inch in diameter and $1/16$ inch thick. The stucco anchorage nail according to the present invention has an overall length of 22 inches with the textured portion 14 being 12 inches in length. The length of the tip from the end of the texture to the pointed tips 16 is $3/16$ of an inch and the ring 22 is located 2 inch from the beginning of the textured portion 14.

The resilient ring 24 in an exemplary embodiment is $1/8$ of an inch thick with a $3/8$ inch outside diameter and a $3/16$ inch inside diameter. As indicated previously, the resilient ring is preassembled and fitted onto the nail and seated against ring 22 before the nail is used. In an exemplary embodiment, ring 24 is a neoprene washer.

In new construction, the stucco anchorage nail according to the present invention is driven into the drip screed and the wood framing typically at 8 inches on center intervals. The spiral or ring shank texture on portion 14 is driven through the wood framing and the texturing threading enables the nail to resist pullout when subjected to lateral forces. In use, the nail is driven through the drip screed which overlies the mud sill on wood frame construction and penetrates the drip screed and extends approximately $1/2$ inch into the framing. The ring 22 and ring 24 assembly is driven against the building paper overlay which is applied over the framing and the drip screed and the ring 24 is tightly seated against the paper and the drip screed. The provision of resilient ring 24 such as a neoprene washer minimizes moisture intrusion around the nails and into the framing and the flooring.

The structure of the nail means that approximately $1/2$ inch of the nail protrudes from the drip screed to the exterior of the structure and this $1/2$ inch projection from the drip screed permits a typical $3/8$ inch thick stucco scratch coat to be applied by a plasterer with minimal interference such that the scratch coat fills in most of the space along upper shank portion 18 leaving the head 15 protruding from the scratch coat after said coat has been applied. A second coat of plaster, called brown coat, which is $1/4$ inch thick is then applied covering head 15 of the nail. A finish or color coat is then applied to complete the stucco sheathing. The smooth lower shank portion 20 of the nail below rings 22 and 24 facilitates the bearing of full loads on the first $1/2$ inch penetration of the nail into the wood mud sill and other wood frame members.

In fabrication, the exemplary embodiment of the invention is to heat treat the nail after it has been fabricated. The heat treating of the nails provides ductility to the nails which enhances their flexibility and strength during the lateral back and forth motion imposed on the nail during earthquake and hurricane lateral forces. After heat treating the nail is hot-dipped galvanized to resist corrosion from moisture that can accumulate at the bottom of the stucco between the back face of the stucco and the building paper backing.

The present invention addresses the need demonstrated by tests of conventionally attached stucco sheathing that failed at the sill plate, with and without drip screeds. The failures were similar to the resulting damage during past earthquakes. Failure occurred at lateral displacements between $3/8$ inch and $3/4$ inch, very similar to drywall. A better connection is produced between the stucco and the wood sill plate by the stucco anchorage nail of the present invention, a special heat treated nail by $2 1/2$ inches long, with a double head that projects $1/2$ inch into the stucco, to develop shear resistance. The nail has a neoprene rubber ring or grommet under the second head to seal the nail hole at the face of the building paper. A $1 1/2$ inch length of the nail at the pointed end has a ring shank or spiral textured treatment to prevent pull-out of the nail as the panel is racked by lateral forces. Heat treating the nails after fabrication provides a more flexible nail to enhance the cyclic performance of the stucco. To reduce diagonal cracks that typically occur at the corners of openings, such as doors and windows, a flat 4 inch wide by 24 inch long strip of expanded metal lath is pressed diagonally at each opening corner into the initial $3/8$ inch thick stucco scratch coat immediately after troweling.

The nail of the present invention is spaced to provide desired stucco shear resistance at the sill plate, panel edges and at jambs toward developing the potential 1,000 pounds per foot yield limit shear value of stucco and integral wire netting.

In summary, the present invention provides an inexpensive device and method for improving a building structure's resistance to earthquake and/or hurricane forces. This reduces structural damage to the building structure's stucco sheathing, interior wall sheathing and prolongs the occupancy of wood framed structures.

The preceding description has been presented with reference to certain embodiments of the invention. Workers skilled in the art and technology to which this invention pertains will appreciate that alterations and changes in the described structure may be practiced without meaningfully departing from the principal, spirit and scope of the invention. Accordingly, the foregoing description should not be read as pertaining only to the precise structures described and illustrated in the accompanying drawings, but rather should be read consistent with and as support to the appended claims which are to have their fullest and fair scope.

What is claimed is:

1. A fastener for anchoring exterior stucco comprising:
   a body having a predetermined axial length, the body comprising:
   a nail head at one axial end of the body;
   a pointed tip portion at the opposite axial end of the body;
   a textured portion located adjacent the pointed tip portion;
   a smooth shank portion extending between the nail head and the textured portion, wherein the shank portion has an axial length in excess of at least one-third of the axial length of the fastener body;
   a raised ring integrally formed in the smooth shank portion approximately half way between the nail head and textured portion; and
   a resilient ring seated against the raised ring on the side of the raised ring opposite the nail head to retard the intrusion of moisture along the axis of the fastener.

2. The fastener of claim 1, wherein the axial length of the textured portion is at least one-half of the axial length of the fastener body.

3. The fastener of claim 2, wherein the axial length of the shank portion is approximately 1 inch and the axial length of the fastener body is approximately 2-½ inches.

4. The fastener of claim 3, wherein the nail head is approximately 9/32 inch in diameter and the raised ring is approximately ¼ inch in diameter.

5. The fastener of claim 1, wherein the resilient ring is approximately ⅛ inch thick.

6. The fastener of claim 5, wherein the resilient ring is comprised of neoprene.

7. The fastener of claim 1, wherein the textured portion has a spiral pattern.

8. The fastener of claim 1, wherein the textured portion has a plurality of closely spaced raised rings.

9. A building structure comprising:
   a building frame;
   one or more layers of stucco sheathing; and
   a plurality of fasteners for securing a predetermined portion of the stucco sheathing to the building frame, wherein each fastener comprises:
   a body of a predetermined axial length having a nail head at one axial end of the body, a pointed tip portion at the opposite axial end of the body, a textured portion located adjacent the pointed tip portion; a smooth shank portion extending between the nail head and the textured portion, wherein the shank portion has an axial length in excess of at least one-third of the axial length of the fastener body, a raised ring integrally formed in the textured shank portion approximately halfway between the nail head and the textured portion and a resilient ring seated against the raised ring on the side of the raised ring opposite the nail head.

10. The building structure of claim 9, wherein at least a portion of the pointed tip of each fastener shank extends into the building frame.

11. The building structure of claim 9, wherein the resilient ring on each fastener is disposed against an outer surface of the stucco sheathing to resist the intrusion of moisture into the building frame.

12. The building structure of claim 11, wherein each resilient ring is comprised of neoprene.

13. A method of improving a lateral resistance of a stucco sheathing that is attached to a building frame comprising:
   providing a building frame;
   providing one or more layers of stucco sheathing;
   providing a plurality of fasteners driven into the frame members, wherein each fastener comprises:
   a body of a predetermined axial length having a nail head at one axial end of the body, a pointed tip portion at the opposite axial end of the body, a textured portion located adjacent the pointed tip portion, a smooth shank portion extending between the nail head and the textured portion, wherein the shank portion has an axial length in excess of at least one-third of the axial length of the fastener body, a raised ring integrally formed in the shank portion approximately halfway between the nail head and textured portion and a resilient ring seated against the raised ring on the side of the raised ring opposite the nail head; and
   installing the plurality of fasteners in the frame members to provide anchorage for the stucco sheathing to be applied to the building frame.

14. The method of claim 13, wherein installing the plurality of fasteners in the stucco sheathing includes installing at least a portion of the axial length of each fastener shank into the building frame to transfer lateral forces from the stucco sheathing to the building frame.

15. The method of claim 13, wherein the resilient ring on each fastener is disposed in a moisture resistant surrounding relation to an outer surface of the stucco sheathing.

16. The method of claim 15, wherein each resilient ring is comprised of neoprene.

* * * * *

Disclaimer

6,928,778 — Ben L. Schmid, Balboa Island, CA (US). STUCCO ANCHORAGE NAIL. Patent dated August 16, 2005. Disclaimer filed June 15, 2006, by the inventor.

The term of this patent shall not extend beyond the expiration date of Pat. No. 6,928,778.

*(Official Gazette, May 27, 2008)*